July 23, 1946.   H. H. WASHBOND   2,404,759
BULLDOZER OR SCRAPER STRUCTURE
Filed Feb. 22, 1944   4 Sheets-Sheet 4
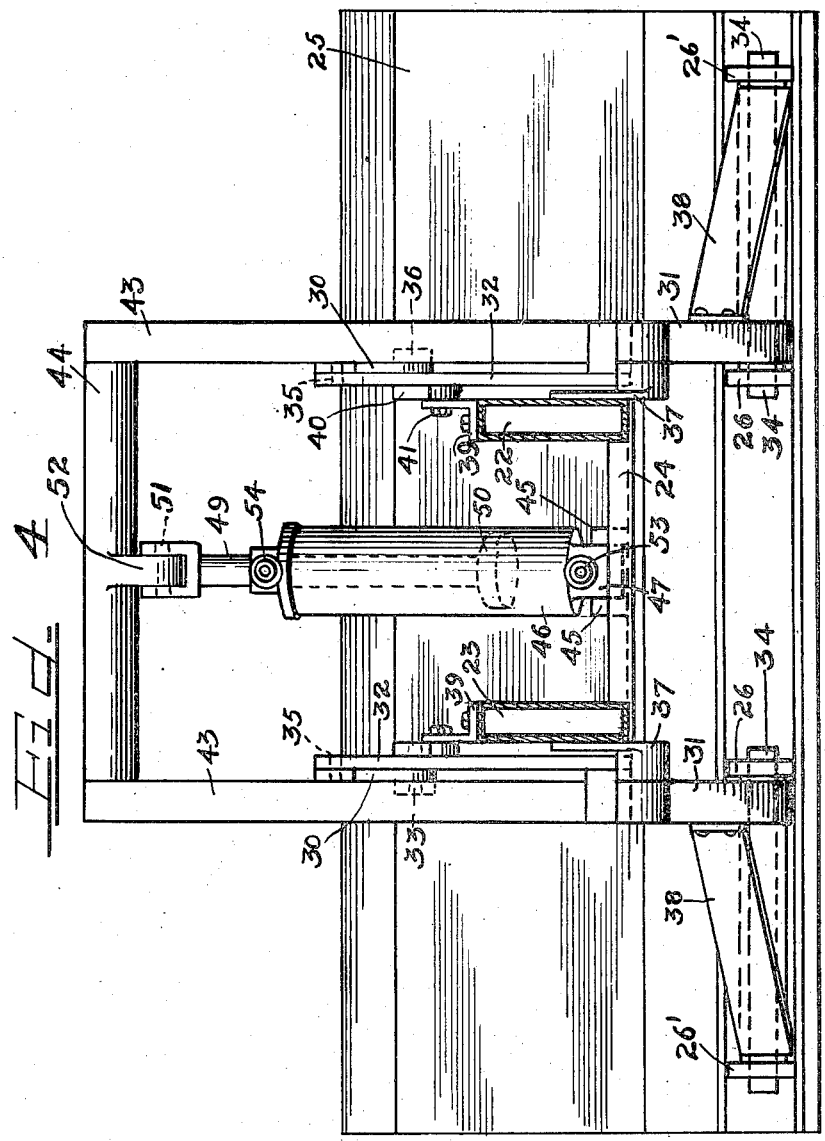
Inventor
Harry H. Washbond.
by Charles H. Hill Attys.

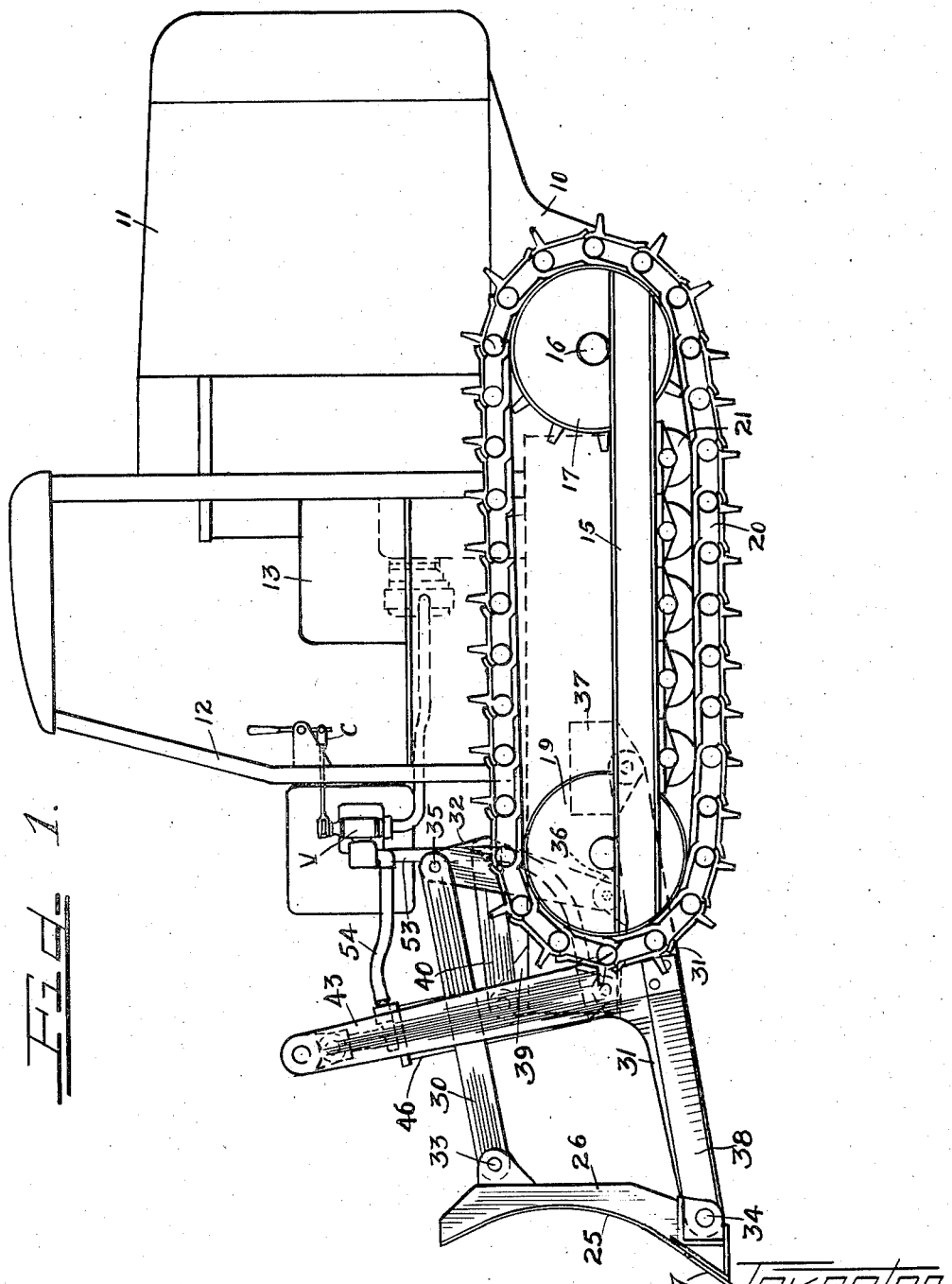

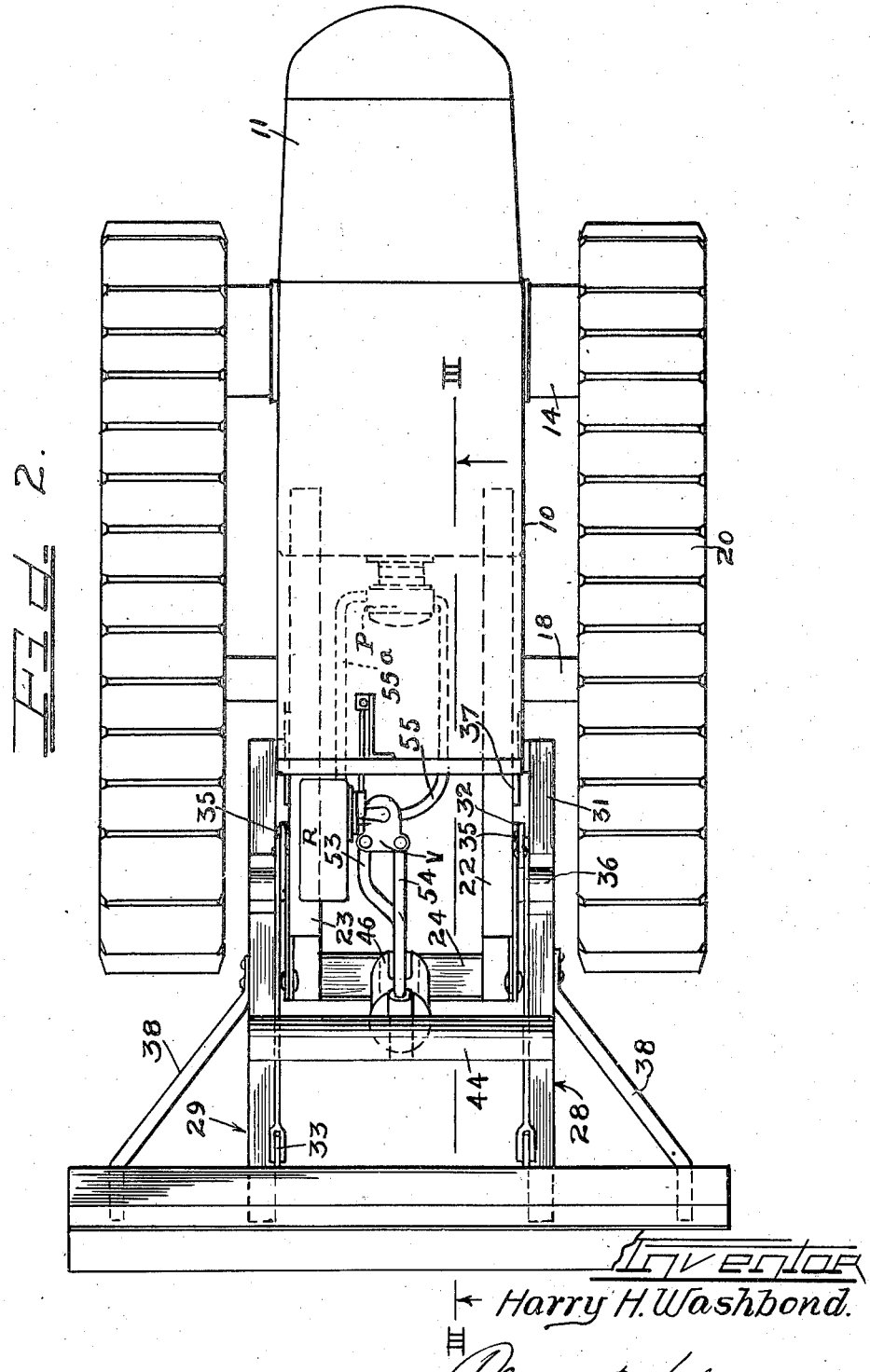

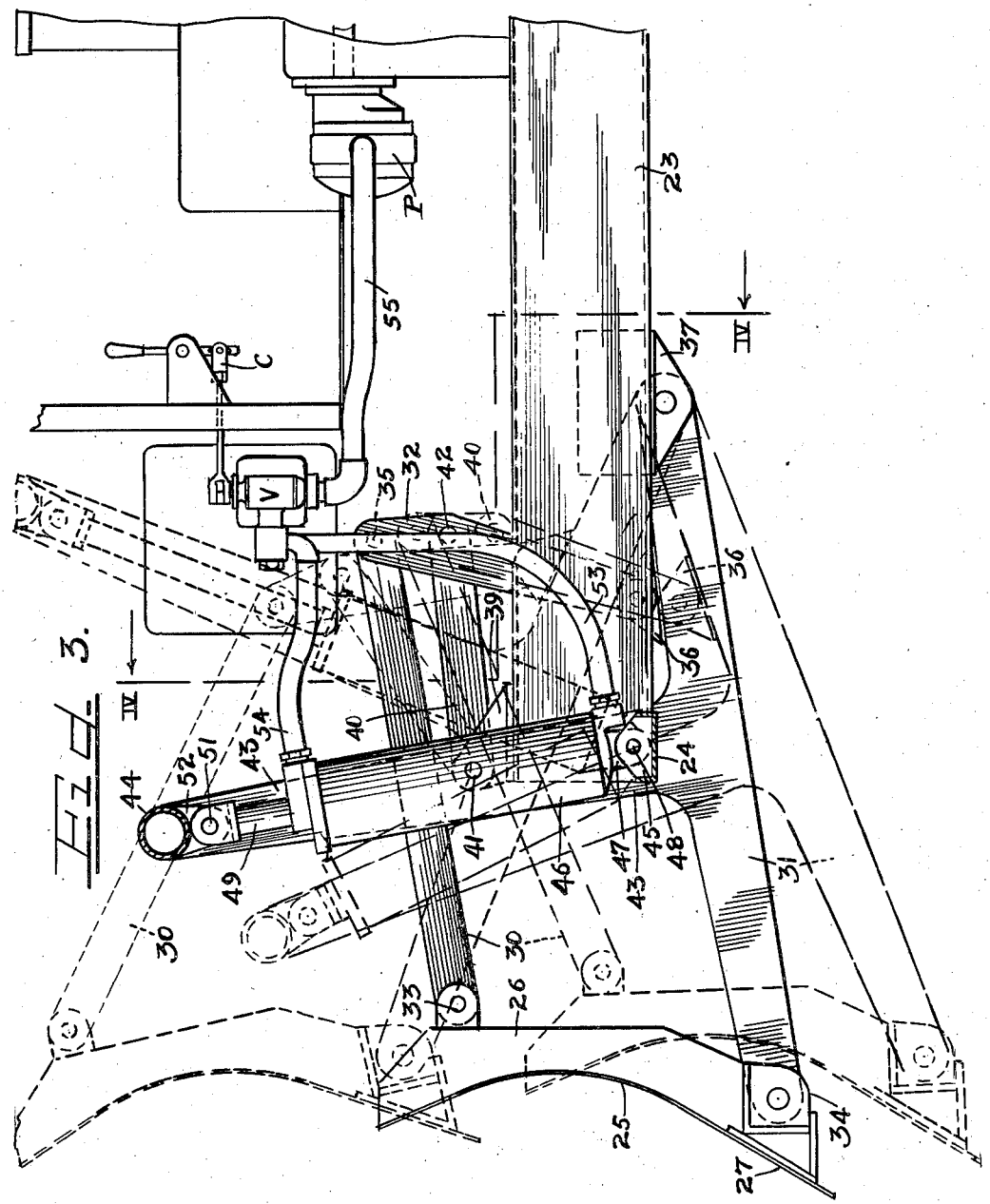

Patented July 23, 1946

2,404,759

UNITED STATES PATENT OFFICE 2,404,759

BULLDOZER OR SCRAPER STRUCTURE

Harry H. Washbond, Springfield, Ill., assignor to The Baker Manufacturing Company, Springfield, Ill., a corporation of Illinois Application February 22, 1944, Serial No. 523,464

17 Claims. (Cl. 37—144)

This invention relates to a bulldozer or scraper structure adapted for attachment to and control from a power vehicle such as a tractor.

An important object of the invention is to produce a bulldozer or scraper whose operating parts are supported on the front end of a power vehicle in front of the driver's cab so that the driver may readily observe the operation.

Another object is to provide an arrangement in which the support for the blade element of the bulldozer or scraper embodies a pair of linkage quadrilaterals of which the blade element constitutes the front link.

A further object is to provide an arrangement in which hydraulic ram structure mounted on the vehicle is connected to directly apply power to the lower links of the linkages for operation of said linkages to set said blade element to various operating positions in a substantially vertical direction.

Another object is to provide an arrangement in which the lower links of the linkages are hinged to the vehicle body and a single hydraulic cylinder-piston structure functions to directly swing the lower links for setting of the scraper structure.

Other and further objects of the invention will become apparent to those skilled in the art from the following detailed description of the annexed sheets of drawings which disclose the preferred embodiments of the invention.

On the drawings:

Figure 1 is a side elevation of a power vehicle with the bulldozer or scraper structure thereon;

Figure 2 is a plan view;

Figure 3 is an enlarged section on plane III—III Figure 2; and

Figure 4 is a section on plane IV—IV Figure 3.

The power vehicle to which I have shown my improved bulldozer or scraper assembly applied is a tractor of the type in which the driving engine is at the rear of the vehicle body and the driver's cab is at the front. Briefly describing the tractor, it comprises the frame or body 10 at the rear of which is mounted the engine frame 11 and at the front of which is located the driver's cab 12 having a seat 13 therein. A rear axle housing 14 supports the track frames 15, and transmission means (not shown) within the axle housing is driven by the engine for drive of the shaft structure 16 which carries the driving sprockets 17. Forwardly of the rear axle housing, a cross support 18 extends from the vehicle body to the track frames 15, and on the forward ends of the track frames are mounted the idler wheels 19, endless tracks 20 engaging the sprocket wheels and idler wheels at opposite sides of the vehicle. Track rollers 21 on the track frame engage with the lower runs of the tracks.

Secured to and extending forwardly from the vehicle body 10 at opposite sides thereof are the beams 22 and 23 which at their forward ends are spanned by a cross beam 24 secured against the undersides thereof. This beam structure serves as a support for the bulldozer or scraper assembly.

The blade element of the bulldozer comprises the transversely curved blade 25 reinforced by ribs 26 secured to its rear side, a knife edge 27 forming the lower portion of the blade. This blade element constitutes the front link of two quadrilateral linkage assemblies 28 and 29. The linkages are alike and each comprises an upper link 30, a lower link 31, and an inner link 32, the blade element 25 forming a common outer link for the link assemblies. At their front ends the upper and lower links 30 and 31 are hinged to the blade element 25 by pins 33 and 34. At their rear ends, the upper links 30 are pivoted to the upper ends of the inner links 32 by pins 35. At their lower ends the inner links 32 are pivoted to brackets 36 secured on the lower links 31. The lower links extend rearwardly beyond their connections with the inner links 32 to be fulcrumed on brackets 37 secured to the beams 22 and 23. Brace bars 38 extend between the lower links 31 and the ends of the blade element 25 to stiffen the blade element and form additional support therefor. As shown on Figures 1 and 4, the pins 34 which extend through the inner ribs 26 on the blade 25 are extended laterally outwardly through outer ribs 26' to receive the front ends of the brace bars 38 to hinge connect them with the blade element.

On the forward ends of the beams 22, 23, brackets 39 are secured, links 40 being pivoted to the brackets as indicated at 41 and at their rear ends are pivoted to the corresponding inner links 32 as indicated at 42. These links 40 hold the links of the linkage quadrilaterals in relative position for the desired tilt or rake of the blade element from the perpendicular.

Extending upwardly from each of the lower links forwardly of the connection of the link with the corresponding inner link 32 is an arm 43, these arms being connected at their upper ends by a cross beam 44. The beam 24 connecting the forward ends of the beams 22 and 23 has upstanding ears 45. A cylinder 46 has a lug 47 depending from its lower end between the ears 45 to be hinged thereto by a pin 48. The piston rod 49 extending upwardly from the piston 50 in the cylinder is connected by a pin 51 with the arm 52 extending down from the cross bar 44 midway between the arms 43. Hydraulic fluid conductors 53 and 54 extend from the lower and upper ends of the cylinder to a valve structure V for which a suitable control C is provided for operation by the driver in the cab. From a pump P hydraulic fluid is delivered under pressure through a conductor 55 to the valve structure for flow to either end of the cylinder by the setting of the valve V by the control C. The fluid is fed to pump P from reservoir R through conductor 55a. The rake movement of the blade is automatically effected by operation of the same hydraulic jack causing raising and lowering of the blade and occurs simultaneously with said raising and lowering.

On Figure 3, the full lines show the scraper structure in an intermediate position. If it is desired to lower the scraper structure, the valve V is set by the control C for flow of hydraulic fluid through the conductor 54 into the top of the cylinder for inward movement of the piston, and this movement is transmitted by the cross bar 42 and the arms 43 to the lower links 31. The lowered position is indicated by the long dot lines on Figure 3. If it is desired to raise the scraper structure, the control C is set for flow into the lower end of the cylinder for outward movement of the piston, the short dot lines on Figure 3 showing the raised position of the structure.

When the vehicle is driven forwardly for operation of the scraper structure, the lower links 31 will function as push beams for engagement of the knife end 27 of the blade structure with the terrain which is to be scraped or operated upon. The upper and inner links 30, 32 and the intermediate links 40 will then function to hold the upper portion of the blade element to maintain the proper tilt or rake of the blade element. It is desirable to have these links arranged so that the blade is held in vertical position throughout a scraping range extending above and below the ground line of the tractor and cause the blade to tilt forward at levels above the scraping range for facilitating release of dirt from the blade. For example, the links can be arranged to hold the blade in vertical position from a lower level of about 12 inches below the ground line of the tractor to an upper level of about 12 inches above the ground line and then tilt the upper end of the blade forwardly about 15°. With the arrangement of the hydraulic jack exerting hydraulic power directly on the push links 31 through the arms 43 on the links, the scraper structure will respond quickly to the hydraulic power without loss of motion. With the scraper structure mounted on the vehicle directly in front of the cab, the operator can readily observe the structure and control the operation thereof.

With the push links 31 and the arms 43 and cross bar 44 forming a rigid unitary structure, a single hydraulic jack connected with the cross bar at its middle point will effect the swing of both the push links and the setting of the scraper, and the cost of manufacture of the scraper structure and its control is correspondingly reduced.

I am aware that many changes may be made and numerous details of construction may be varied through a wide range without departing from the principles of this invention, and I therefore do not purpose limiting the patent granted herein otherwise than necessitated by the prior art.

I claim as follows:

1. In a machine of the character described including a vehicle body and propulsion means therefor, a bulldozer attachment for the front of the vehicle comprising a blade element, a support for said blade embodying a pair of linkage quadrilaterals of which said blade element constitutes the outer link, the lower links of said linkage quadrilaterals being hinged at their rear ends to the vehicle body to constitute push bars for the blade element, hydraulic power means connected with said linkage quadrilaterals for operation therefor for setting of said blade element in vertical direction, and guide links between said linkage quadrilaterals and the vehicle body for determining the rake of the blade element during vertical movement thereof.

2. In combination with a tractor comprising a body and propulsion means therefor, a bulldozer comprising a blade element, push links hinged at their rear ends to the vehicle body and extending forwardly therefrom for connection with the lower portion of said blade element, arms rigidly connected with said push links intermediate their ends and extending upwardly therefrom, hydraulic ram means operatively connected between the vehicle and said arms, and a linkage assembly including link pairs connected with said push links and said blade element and other links extending from said link pairs to the vehicle body operative to maintain said blade element substantially in a vertical plane during raising or lowering thereof by said hydraulic means.

3. In combination with a tractor comprising a body and propulsion means therefor, a bulldozer at the front of said body comprising a blade element, lower links forming push bars hinged at their rear ends to the vehicle body and connected at their forward ends with the lower portion of said blade element, hydraulic power means on said body connected with said push bar links for effecting vertical swing of said links for setting of the blade element, upper links connected at their outer ends with the upper portion of said blade element, inner links pivoted at their upper ends to the inner ends of said upper links and at their lower ends being pivoted to said push links, intermediate links pivoted at one end to the vehicle body and at their other ends to said inner links, said links cooperating during setting of said blade element to maintain a predetermined rake of said blade element from the perpendicular.

4. In combination with a tractor comprising a body and propulsion means therefor, a bulldozer structure located in front of said tractor body and comprising a blade element, push bars at opposite sides of the vehicle body hinged at their rear ends to the vehicle body and at their front ends hinged to the lower portion of said blade element, hydraulic power means on the vehicle body connected with said push bars for vertical swing thereof and operation setting of said blade element, linkage assemblies between said push bars and the upper portion of said blade element, and guide links between the vehicle body and said linkage assemblies, said linkage assemblies functioning to maintain a predetermined rake of the blade element.

5. In combination with a power vehicle comprising a body and propulsion means therefor, a bulldozer structure located in front of the vehicle body and comprising a blade element, push bars at opposite sides of the vehicle body hinged at their rear ends thereto and extending forwardly therefrom for hinge connection with the lower portion of said blade element, power means on the vehicle connected with said push bars for effecting vertical swing thereof, a linkage assembly connecting the upper portion of said blade element with said push bars, and guide links between said linkage assembly and the vehicle body for determining the rake of the blade element when moved vertically with said push bars.

6. A front end implement blade mounting for a tractor comprising push beams for pivotal mounting at their rear ends on a tractor, an implement blade having the bottom portion thereof pivoted to the front ends of the push beams, arms pivoted to the top portion of the blade, first links pivotally connecting said arms with said push beams, second links pivotally connected to said first links for connecting the first links to the tractor to hold the implement blade in vertical position, and means acting on said push beams to raise and lower the implement blade.

7. In a machine of the character described including a vehicle body and propulsion means therefor, a bulldozer attachment for the front end of the vehicle comprising a blade element, a support for said blade embodying a pair of linkage quadrilaterals of which said blade element constitutes the outer link, the lower links of said linkage quadrilaterals being hinged at their rear ends to the vehicle body to constitute push bars for the blade element, power means connected with said quadrilaterals for positively raising and lowering the blade element, and guide links between said quadrilaterals and the vehicle body for causing said quadrilaterals to maintain a predetermined rake of the blade element.

8. An implement blade attachment for tractors and the like comprising a blade, push beams pivoted to the lower portion of the blade, first links pivoted to the upper portion of the blade, second links pivotally connecting said first links and said push beams, and means on the tractor pivoted to said second links for holding the blade in substantially the same vertical plane throughout its scraping range but effective to rapidly tilt the upper portion of the blade forwardly when the blade is raised above its scraping range.

9. In combination with a tractor, an implement blade extending across the front of the tractor, push beams pivotally connected to the lower portion of the implement blade and to the tractor, first links pivotally connected to the upper portion of the blade and extending rearwardly therefrom, second links pivoted to the rear ends of the first links and to the push beams intermediate the ends of the push beams, hydraulic means interposed between the tractor and push beams to raise and lower the implement blade relative to the tractor, and means on the tractor acting on said second links to hold the blade in a substantially vertical plane from a lower level of about twelve inches below the ground line of the tractor to an upper level of about twelve inches above the ground line of the tractor and then being effective to tilt the upper end of the blade forwardly about 15° as the blade is raised more than twelve inches above the ground line of the tractor.

10. In combination with a tractor, a bulldozer structure located in front of said tractor and comprising a blade element, push beams at opposite sides of the tractor hinged at their rear ends to said tractor and at their front ends hinged to the lower portion of said blade element, arms extending upwardly from said push beams, a cross bar connecting the upper ends of said arms, hydraulic power means on the tractor directly connected with said cross bar to act through said arms for swinging the push beams to control the operation setting of said blade element, a linkage assembly between said push beams and blade element, and a guide link between the linkage assembly and tractor to control the rake of the blade element as it is raised and lowered relative to the tractor.

11. In combination with a tractor comprising a body and propulsion means therefor, a bulldozer structure located in front of the tractor body comprising a blade element, push beams hinged at their rear ends to the body and extending forwardly therefrom, brace beams extending diagonally from the push beams near the forward ends thereof, a common hinge pin for connecting the outer end of each push beam and the outer end of the corresponding brace beam to the blade element whereby said blade element has hinge connection with said push beams, power means on said tractor connected with said push beams for effecting vertical swing thereof, a linkage assembly between said push beams and blade element, and a guide link on the tractor body connected to the linkage assembly for controlling the rake of the blade as it is raised and lowered relative to the vehicle.

12. In combination with a vehicle, push beams pivoted on the vehicle, an implement blade pivoted on said push beams, means for raising and lowering said blade, a link connected to the blade, a fulcrum for said link, and means responsive to raising and lowering of the blade for shifting said fulcrum relative to the push beams to control the rake of the blade.

13. In combination with a front end cab type tractor, short push beams pivoted on the front end of the tractor, a blade having its lower portion pivoted on the front ends of the push beams, means for raising and lowering said blade, linkage means pivoted to the upper portion of said blade and to said push beams, and guide link means pivotally connecting the linkage means and tractor for swinging the blade relative to the push beams as the blade is raised and lowered for controlling the rake of the blade.

14. In combination with a tractor, a bulldozer or scraper structure having push beams pivoted on the tractor, a blade element pivoted on the front ends of the push beams, power means for raising and lowering said push beams and blade element, a link assembly connected to the blade and a push beam, and a guide link between the tractor and said link assembly for maintaining a relatively vertical position of the blade element through a normal scraping range above and below the tractor ground line and for tilting said blade element forward at a predetermined rate between scraping range and raised position to shed dirt.

15. In combination with a tractor, push beams pivoted on the tractor, a scraping blade pivoted on the push beams, means for raising and lowering said push beams and blade, a link connected to the blade, a fulcrum for said link, and means responsive to raising and lowering movements of the blade for shifting said fulcrum relative to the push beams to maintain a substantially vertical position for the blade in the scraping range thereof and to tilt the blade forward to shed dirt above said scraping range of the blade.

16. In combination with a vehicle, an implement blade extending across the front of the vehicle, push beams pivoted on the vehicle for raising and lowering movements, means connecting the push beams together for cross-stabilizing the beams to compel co-movement of the beams, pivots connecting the lower portion of the blade and the push beams, said pivots swingably mounting the blade for forward and rearward tilting movements, means for raising and lowering the blade relative to the vehicle, a link connected to the blade, a fulcrum for said link, and means responsive to raising and lowering of the blade for shifting said fulcrum relative to the push beams to control the rake of the blade.

17. In combination with a vehicle, an implement blade extending across the front of the vehicle, push beams pivoted on the vehicle for raising and lowering movements, means connecting said push beams together for cross stabilizing the beams to compel co-movement of the beams, pivots connecting the lower portion of the blade and push beams, said pivots swingably mounting the blade for forward and rearwardward tilting movements, means for raising and lowering the blade relative to the vehicle, a link connected to the upper portion of the blade, a fulcrum for the link, and means responsive to raising and lowering of the blade for shifting said fulcrum relative to the push beams to control the rake of the blade to maintain a substantially upright scraping position as the blade is raised and lowered through a normal scraping range above and below the ground line of the vehicle and to tilt the blade forwardly for shedding dirt as the blade is raised above the normal scraping range.

HARRY H. WASHBOND.